United States Patent [19]

Kuwayama et al.

[11] Patent Number: 5,020,393
[45] Date of Patent: Jun. 4, 1991

[54] HYDRAULIC CONTROLLER FOR AN AUTOMATIC TRANSMISSION

[75] Inventors: Yoshinari Kuwayama; Masahiko Ando; Yoichi Hayakawa, all of Aichi, Japan

[73] Assignee: Aisin AW Kabushiki Kaisha, Japan

[21] Appl. No.: 544,692

[22] Filed: Jun. 27, 1990

[30] Foreign Application Priority Data

Jun. 29, 1989 [JP] Japan .................. 1-167516

[51] Int. Cl.$^5$ ............................................. B60K 41/06
[52] U.S. Cl. ...................................... 74/869; 475/128; 475/129; 74/868
[58] Field of Search .................. 74/868, 869; 475/143, 475/123, 128, 127

[56] References Cited

U.S. PATENT DOCUMENTS

| | | | |
|---|---|---|---|
| 2,926,543 | 3/1960 | Holdeman et al. | 74/869 |
| 3,309,939 | 3/1967 | Pierce | 74/869 X |
| 4,729,265 | 3/1988 | Sugano | 74/868 |
| 4,754,403 | 6/1988 | Hiramatsu | 74/868 X |
| 4,867,014 | 9/1989 | Sugano | 74/868 OR |
| 4,930,373 | 6/1990 | Nakawaki et al. | 475/128 X |
| 4,938,103 | 7/1990 | Sugano | 74/868 X |

Primary Examiner—Allan D. Herrmann
Assistant Examiner—Dan Wittels
Attorney, Agent, or Firm—Lorusso & Loud

[57] ABSTRACT

A hydraulic controller for an automatic transmission, having a band brake having a large stopping force based on a self-boosting effect against rotation in a self-binding direction and having a comparatively small stopping force against rotation in the unbinding direction, a modulator valve for producing a modulator pressure by reducing a line pressure, a band brake hydraulic servo having a brake engaging hydraulic chamber and a brake releasing hydraulic chamber. A line pressure is supplied to the band brake hydraulic servo to stop rotation in the self binding direction when a predetermined transmission speed is selected. The line pressure is also supplied the band brake hydraulic servo to stop rotation in the unbinding direction when another transmission speed is selected. A modulator pressure is supplied to the brake engaging hydraulic chamber to stop the rotation in the self-binding direction of the band brake and to allow the rotation in the unbinding direction when an intermediate speed is selected. The risk of any shift from the predetermined speed to another speed via the intermediate speed is eliminated, thereby enabling the transmission to be shifted always correctly while reducing shift shocks.

12 Claims, 7 Drawing Sheets

Fig. 4

| | | SOLENOID | | | CLUTCH | | | | BRAKE | | O.W.C | |
|---|---|---|---|---|---|---|---|---|---|---|---|---|
| | | SL1 | SL2 | SL3 | C0 | C1 | C2 | C3 | B1 | B2 | F0 | F1 |
| P | | X | X | X | X | X | X | X | X | X | X | X |
| R | V≦7 | X | X | X | X | X | ○ | X | X | ○ | X | X |
| | V>7 | ○ | X | X | X | X | ○ | X | X | X | X | X |
| N | | X | X | X | X | X | X | X | X | X | X | X |
| D | 1ST | ○ | X | X | X | ○ | X | X | X | X | ○ | ○ |
| | 2ND | ○ | ○ | ◎ | X | ○ | X | X | ○ | X | ○ | X |
| | 3RD | X | ○ | ◎ | ○ | ○ | ○ | ○ | ◎ | X | ○ | X |
| | 4TH | X | X | ◎ | ○ | ○ | X | X | ○ | X | X | X |
| 3 | 1ST | ○ | X | X | X | ○ | X | X | X | X | ○ | ○ |
| | 2ND | ○ | ○ | ◎ | X | ○ | X | X | ○ | X | ○ | X |
| | 3RD | X | ○ | ◎ | ○ | ○ | ○ | ○ | ◎ | X | ○ | X |
| | (3RD) | X | X | X | ○ | ○ | ○ | ○ | ◎ | X | ○ | X |
| 2 | 1ST | ○ | X | X | X | ○ | X | ○ | X | X | ○ | ○ |
| | 2ND | ○ | ○ | ◎ | X | ○ | X | ○ | ○ | X | ○ | X |
| | 3RD | X | ○ | ◎ | ○ | ○ | X | ○ | ◎ | X | ○ | X |
| | (3RD) | X | X | X | ○ | ○ | X | ○ | ◎ | X | ○ | X |
| 1 | 1ST | ○ | X | X | X | ○ | X | ○ | X | ○ | ○ | ○ |
| | 2ND | ○ | ○ | X | X | ○ | X | ○ | ○ | X | ○ | X |
| | (2RD) | X | ○ | X | X | ○ | X | ○ | ○ | X | ○ | X |
| | (1ST) | X | X | X | X | ○ | X | ○ | X | ○ | ○ | ○ |

| SYMBOLS | ○ | ON | ENGAGED | LOCKED |
|---|---|---|---|---|
| | X | OFF | RELEASED | FREE |
| | ◎ | ON: L-UP ON / OFF: L-UP OFF | BRAKE B1 RELEASED BY B1 RELEASE PRESSURE | |

HYDRAULIC CONTROLLER FOR AN AUTOMATIC TRANSMISSION

BACKGROUND OF THE INVENTION

This invention relates generally to automatic transmissions mounted on motor vehicles and, more particularly, to an automatic transmission capable of being suitably mounted on a front engine front drive type small vehicle which requires a reduction in the size of the transmission. More specifically, the present invention relates to a hydraulic controller for changing over the speed of an automatic transmission with a band brake.

Conventionally, in ordinary automatic transmissions, a controller operates a one-way clutch at the time of shifting to a predetermined transmission speed to prevent occurrence of a shift shock caused by clutching changeover of two frictional engagement elements (e.g., a clutch and a brake).

A type of controller which operates no one-way clutch at the time of shifting to a predetermined transmission speed, e.g., a controller which releases a band brake while engaging a clutch is known. In this controller, the timing of supplying a clutch engaging pressure or a band brake releasing pressure produced from the clutch engaging pressure is controlled by means of an orifice control valve.

Another type of controller is known which includes a release valve for simultaneously operating two frictional engagement elements. The release valve is controlled by a solenoid valve so that when one of two frictional engagement elements is released, the other is engaged simultaneously (refer to Japanese Laid-Open Patent No. 62-31741).

However, these types of hydraulic controllers for automatic transmissions entail drawbacks described below. The hydraulic controller using a one-way clutch can prevent occurrence of a shift shock caused by clutching changeover of the frictional engagement elements but requires a multiplicity of one-way clutches for enabling smooth shifting in addition to a multiplicity of clutches and brakes for ordinary use. It therefore makes it difficult to reduce the overall size of the automatic transmission particularly in the axial direction. In some case, the automatic transmission cannot be mounted on a small motor vehicle in which the automatic transmission mount space is restricted.

In the case of the controller which controls the timing of supplying clutch engaging pressure or band brake releasing pressure by using an orifice control valve, the automatic transmission size can be reduced. However, the range of changes in the throttle opening or vehicle speed in which the supply timing can be changed over is limited, and it is difficult to change over the supply timing with respect to the whole range of changes; there is a possibility of occurrence of a large shift shock. The orifice control valve necessitates a complicated control process which increases the cost of the automatic transmission. This controller is also unsatisfactory in terms of reliability because there is a possibility of the supply timing being shifted by hydraulic pressure dispersion or changes in frictional characteristics and viscosity with respect to time.

The controller using a solenoid valve and a release control valve for timing control necessitates a complicated and expensive electrical control system. It is therefore difficult to apply this type of controller to automatic transmissions for small vehicles manufactured under various restrictions.

SUMMARY OF THE INVENTION

It is an object of the present invention to provide an automatic transmission hydraulic controller which is free from the problems of the conventional hydraulic controllers for automatic transmissions, in which a modulator pressure is supplied to a hydraulic servo for a band brake and the difference between stopping forces of the band brake with respect to the self-binding and unbinding directions is utilized to enable the transmission to be shifted to a selected speed always correctly without any substantial shift shocks, and which enables a reduction in the overall size of the transmission to improve the performance in terms of mounting on vehicles.

An automatic transmission hydraulic controller in accordance with the present invention has a band brake provided around a certain element of a shift gear mechanism, the band brake having a large stopping force by a self-boosting force against rotation in a self-binding direction and having a comparatively small stopping force against rotation in the unbinding direction; a modulator valve for producing a modulator pressure by reducing a line pressure; and a band brake hydraulic servo having a brake engaging hydraulic chamber and a brake releasing hydraulic chamber.

The brake engaging hydraulic chamber of the band brake hydraulic servo is supplied with the line pressure to stop rotation in the self-binding direction of the band brake when a predetermined transmission speed is selected. The brake engaging hydraulic chamber is supplied with the line pressure to stop rotation in the unbinding direction of the band brake when another transmission speed is selected. The brake engaging hydraulic chamber is supplied with the modulator pressure to stop rotation in the self-binding direction of the band brake and to allow rotation in the unbinding direction when an intermediate transmission speed is selected.

At time of up-shifting from the predetermined transmission speed (e.g., second speed) or down-shifting from the predetermined speed, therefore, the transmission can be prevented from shifting by being temporarily set to the other speed (e.g., fourth speed) related to the operation of the band brake.

Thus, this controller enables the transmission to be operated for a predetermined shift (e.g., 2nd→3rd up-shift or 3rd→2nd down-shift) without any substantial shift shock with respect to the whole ranges of throttle pressure and vehicle speeds, although it is designed to improve the performance in terms of mounting on a vehicle by removing one-way clutches for a reduction in the transmission size.

The modulator valve has a line pressure supply port, a pressure modulation port, a feedback port, and a restraining control oil chamber.

The restraining control oil chamber is supplied with a restraining hydraulic pressure to provide a direct communication between the line pressure supply port and the pressure modulation port to establish a line pressure supply state when each of the predetermined transmission speed and the other transmission speed is selected. The restraining control oil chamber is supplied with no restraining hydraulic pressure to produce the modulator pressure at the pressure modulation port when the intermediate transmission speed is selected.

This arrangement ensures that the transmission can be smoothly shifted from the predetermined transmission speed to the intermediate speed or from the intermediate speed to the predetermined speed without being operated via another shift stage. When the predetermined transmission speed or the other transmission speed is selected, line pressure is supplied to the brake engaging hydraulic chamber to firmly engage the band brake at a sufficient braking capacity.

A frictional engagement element capable of being held in an engaged state when each of the other transmission speed and the intermediate transmission speed is selected, and a frictional engagement element hydraulic servo for operating this frictional engagement element are provided.

The modulator valve has another control oil chamber for receiving hydraulic pressure for its operation from a throttle pressure control valve, along with the line pressure supply port, the pressure modulation port, the feedback port and the restraining control oil chamber.

It is thereby possible to suitably control the changeover timing by controlling the hydraulic pressure supplied to the brake engaging hydraulic pressure and to thereby achieve smooth shifting at the time of shifting from the predetermined transmission speed to the intermediate transmission speed or from the intermediate speed to the predetermined speed.

A modulator control valve is be connected to the modulator valve. The modulator valve can be operated with the modulator control valve.

The modulator control valve has a first input port, a second input port, an output port communicating with the restraining control oil chamber of the modulator valve, and a control oil chamber communicating with the frictional engagement element hydraulic servo.

The first input port and the output port communicate with each other to supply hydraulic pressure from the first input port to the restraining control oil chamber of the modulator valve when the control oil chamber is supplied with no hydraulic pressure. The second input port and the output port communicate with each other to supply hydraulic pressure from the second input port to the restraining control oil chamber of the modulator valve when the control oil chamber is supplied with hydraulic pressure.

According to this arrangement, the brake engaging hydraulic chamber can be positively and rapidly supplied with the line pressure when the predetermined transmission speed (e.g., second speed) or the other transmission speed (e.g., fourth speed). Also, the transmission can be rapidly and smoothly up-shifted from the predetermined transmission speed or the other transmission speed (e.g., 1st→2nd speed up-shift or 3rd→4th up-shift) or down-shifted from the other speed to the predetermined speed.

The brake releasing hydraulic chamber of the band brake hydraulic servo is connected to a timing valve. This timing valve has a line pressure supply port, a port communicating with the brake releasing hydraulic chamber, and a control oil chamber communicating with the frictional engagement element hydraulic servo.

When the frictional engagement element hydraulic servo is supplied with hydraulic pressure and when this pressure reaches a predetermined level, the line pressure supply port and the port communicating with the brake releasing hydraulic chamber communicate with each other.

According to this arrangement, the brake releasing hydraulic chamber is rapidly supplied with hydraulic pressure when the hydraulic pressure of the frictional engagement element hydraulic servo reaches the predetermined level, thereby effecting suitable timing between the engagement of frictional engagement element and the release of the band brake. Specifically, it is possible to prevent a shift via an undesignated transmission speed (e.g., 2nd→1st→3rd speed shift) owing to an advanced timing of releasing the band brake. Accordingly, in cooperation with the above-mentioned supply of the modulator pressure to the brake engaging hydraulic chamber, this timing control of the band brake enables the transmission to be shifted smoothly without failure (for, e.g., 2nd→3rd speed or 3rd→2nd speed shift).

The timing valve has a second control oil chamber for receiving hydraulic pressure for its operation from a throttle pressure control valve, along with the line pressure supply port, the port communicating with the brake releasing hydraulic chamber and the control oil chamber.

According to this arrangement, the changeover of the timing valve can be controlled so as to correctly effect the timing of clutching changeover between the frictional engagement element and the band brake.

The brake releasing hydraulic chamber of the band brake hydraulic servo is connected to a third shift valve.

The third shift valve has a port communicating with the frictional engagement element hydraulic servo, a port communicating with the brake releasing hydraulic chamber, a port communicating with the second input port of the modulator control valve, a line pressure supply port, and a drain port.

The third shift valve provides a communication between the port communicating with the frictional engagement element hydraulic servo and the port communicating with the brake releasing hydraulic chamber as well as a communication between the port communicating with the second input port and the drain port when it is set to a predetermined changeover position.

The third shift valve closes the port communicating with the frictional engagement element hydraulic servo and provides a communication between the port communicating with the brake releasing hydraulic chamber and the drain port as well as a communication between the line pressure supply port and the second input port when it is set to another changeover position.

According to this arrangement, when the other transmission speed (e.g., fourth speed) is selected, the modulator valve can be restrained in a line supply state to positively maintain this transmission speed, and a shift via an undesignated transmission speed can be prevented. In a case where the transmission is shifted from the other speed to the predetermined speed (for example, from the fourth speed to the second speed) in a skip-down-shifting manner, the transmission can be shifted by one operation while the band brake is maintained in the engaged state without being released, thereby effecting kick-down rapidly and smoothly.

A first shift valve and a second shift valve are provided along with the third shift valve.

The first shift valve has a line pressure supply port, an output port communicating with the line pressure supply port of the modulator valve, and a drain port.

The first shift valve provides a communication between the line pressure supply port and the output port when set to a predetermined changeover position, or it closes the line pressure supply port and provides a communication between the output port and the drain port when set to another changeover position.

The second shift valve has an input port communicating with the output port of the first shift valve, an output port communicating with the frictional engagement element hydraulic servo, a drain port, a line pressure supply port, and a port communicating with the first input port of the modulator control valve.

The second shift valve closes the input port and provides a communication between the output port and the drain port as well as a communication between the line pressure supply port and the port communicating with the first input port of the modulator control valve when set to a predetermined changeover position.

The second shift valve provides a communication between the input port and the output port as well as a communication between the port communicating with the first input port of the modulator control valve and the drain port when set to another changeover position.

The band brake comprises a brake capable of being engaged when a forward second speed is selected and capable of being engaged when a forward fourth speed is selected. The frictional engagement element comprises a clutch capable of being engaged when a forward third speed is selected and capable of being engaged when a forward fourth speed is selected. The first shift valve comprises a 1-2 shift valve changed over for a shift between the first and second speeds. The second shift valve comprises a 2-3 shift valve changed over for a shift between the second and third speeds. The third shift valve comprises a 3-4 shift valve changed over for a shift between the third and fourth speeds.

Other features of and details of the structure of the automatic transmission hydraulic controller in accordance with the present invention will become apparent upon reading the following description with reference to the accompanying drawings.

BRIEF DESCRIPTION OF THE DRAWINGS

FIG. 4 is a diagram of the operation of the transmission;

DESCRIPTION OF THE PREFERRED EMBODIMENTS

Figure 3:
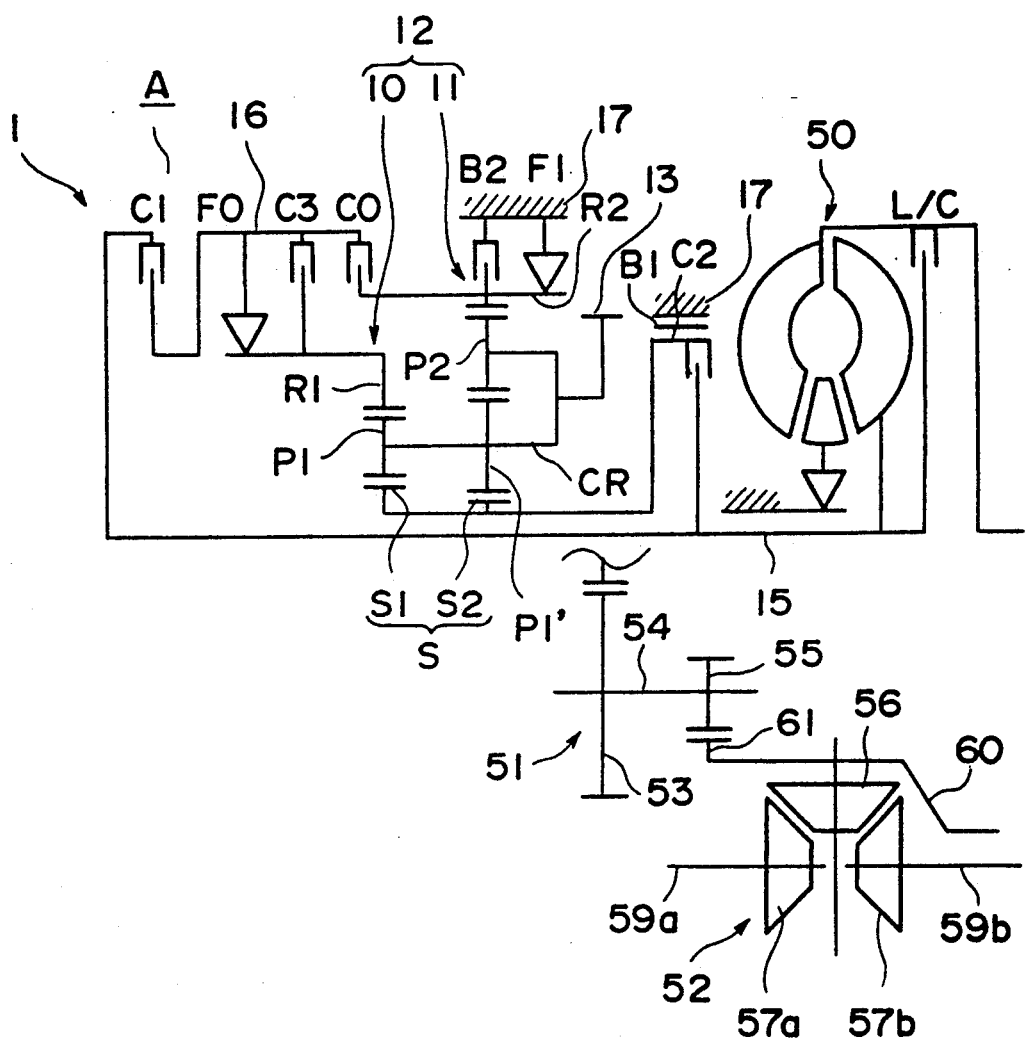
FIG. 3 is a schematic diagram of a shift gear mechanism of the automatic transmission.

As shown in FIG. 3, a four-speed automatic transmission A to which an automatic transmission hydraulic controller in accordance with the present invention is applied has a torque converter 50 having a lock-up clutch L/C, a four-speed shift gear mechanism 1, a reduction gear mechanism 51 and a differential unit 52.

The four-speed shift gear mechanism 1 has a planetary gear unit 12 in which a single planetary gear 10 and a dual planetary gear 11 are connected, and in which sun gears S1 and S2 are formed integrally. For example, the sun gears S1 and S2 have equal numbers of teeth and are formed as one gear S. Pinions P1 and P1' meshing with the sun gears S1 and S2 are also integrally formed of, for example, one long pinion. A carrier CR is also formed integrally on which the pinions P1 and p1' are supported and on which a pinion P2 meshing with a ring gear (hereinafter referred to as "large ring gear") R2 of the dual planetary gear 11 is supported.

An input shaft 15 extending from an output member of the torque converter 50 is connected to a connection member 16 through a first clutch C1 and is also connected to the sun gear S through a second clutch C2. A third clutch C3 and a second one-way clutch F0 are connected between the connection member 16 and a ring gear (hereinafter referred to as "small ring gear") R1 of the single planetary gear 10. A fourth clutch C0 is connected between the connection member 16 and the large ring gear R2. The sun gear S is capable of being restrained by a first brake B1 which comprises a band brake. A second brake B2 and a first one-way clutch F1 are connected between the large ring gear R2 and a case. The carrier CR is connected to an output gear 13 which is positioned generally at the center of the four-speed shift gear mechanism 1.

The first brake B1 has a large restraining force based on its self-boosting force against rotation in a self-binding direction A, but has a comparatively small restraining force against rotation in an unbinding direction B opposite to the self-binding direction A. The first brake B1 serves to achieve a predetermined transmission speed (e.g., second speed) by restraining rotation in the self-binding direction A and to achieve another transmission speed (e.g., fourth speed) by restraining rotation in the unbinding direction B.

The reduction gear mechanism 51 has a counter shaft 54 rotatably supported on the case. Large and small gears 53 and 55 constantly meshing with the output gear 13 are fixed to the shaft 54. The differential unit 52 has a differential pinion 56, and left and right side pinions 57a and 57b which mesh with each other and which are fixed to the left and right front axles 59a and 59b. A differential carrier 60 which supports the differential pinion 56 is rotatably supported on the case. A ring gear 61 is attached to the differential carrier 60 to always mesh with the small gear 55.

Figure 2:
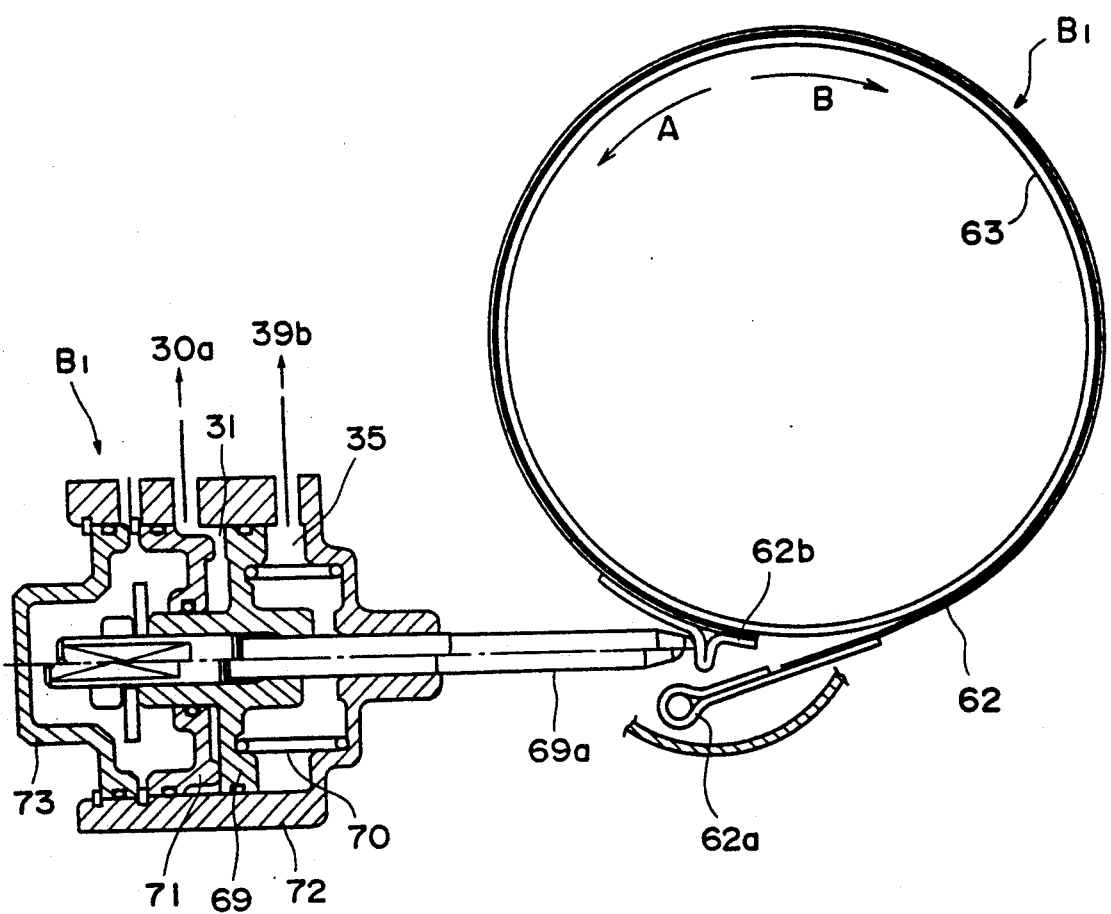
FIG. 2 is a cross-sectional view of a first brake and a hydraulic servo for this brake.

As shown in FIG. 2, the band brake. i.e., the first brake B1 has a band 62 which is connected to the case at its one end 62a. The band 62 is wound around a drum 63 which is integrally connected to the sun gear S. An end 62b of the band 62 is disposed adjacent to a piston rod 69a of a hydraulic servo $B_1$ described later.

Figure 5:
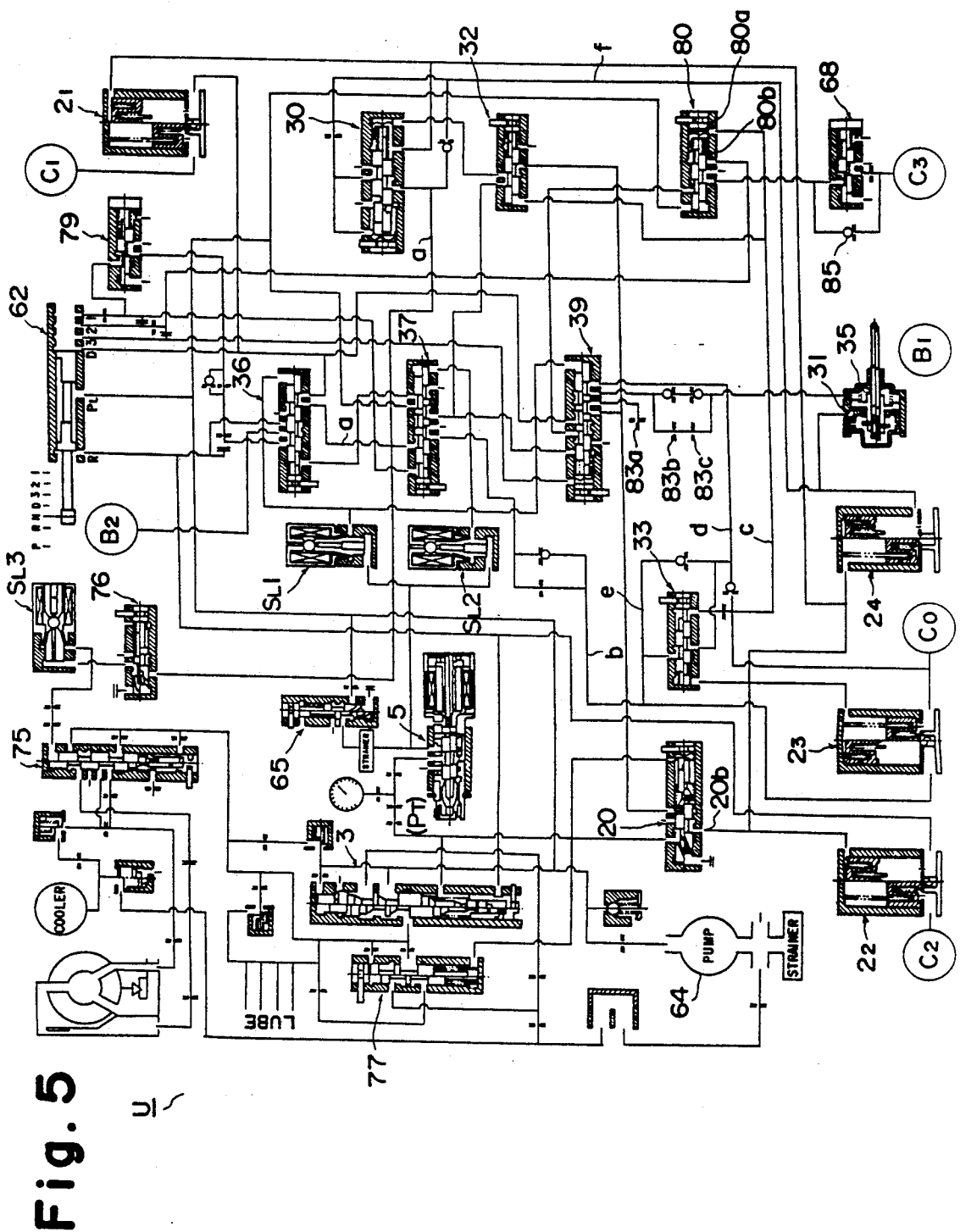
FIG. 5 is a circuit diagram of the whole of the hydraulic controller in accordance with the present invention.

On the other hand, a hydraulic controller U has hydraulic servos $C_1$, $C_2$, $C_3$, $C_0$, $B_1$, and $B_2$ for operating the clutches C1, C2, C3, and C0 and the brakes $B_1$ and $B_2$, respectively, as shown in FIG. 5. Accumulators $2_1$, $2_2$, $2_3$, and $2_4$ are disposed in parallel with the hydraulic servo $C_1$ for the first clutch C1, the hydraulic servo $C_2$ for the second clutch C2, the hydraulic servo $C_0$ for the fourth clutch C0, and the hydraulic servo $B_1$ for the first brake B1. A manual valve 62 is operated by the driver to change over oil passages to shift the transmission speed to each speed range. That is, the manual valve 62 is changed over so as to make a line pressure oil passage $P_L$ communicate with a port D for a range D, with the port D and a port 3 for a range 3, with the port D, the port 3 and a port 2 for a range 2, or with a port R for a range R.

A primary regulator valve 3 receives a throttle pressure and hydraulic pressures supplied from the range R port and so on as signal pressures, and suitably controls a hydraulic pressure from an oil pressure source, namely, a pump 64 to produce a line pressure. A throttle pressure control valve 5 which comprises a linear solenoid valve is controlled by an electrical signal based on the throttle opening and other factors to produce a predetermined throttle pressure ($P_T$).

Figure 6:
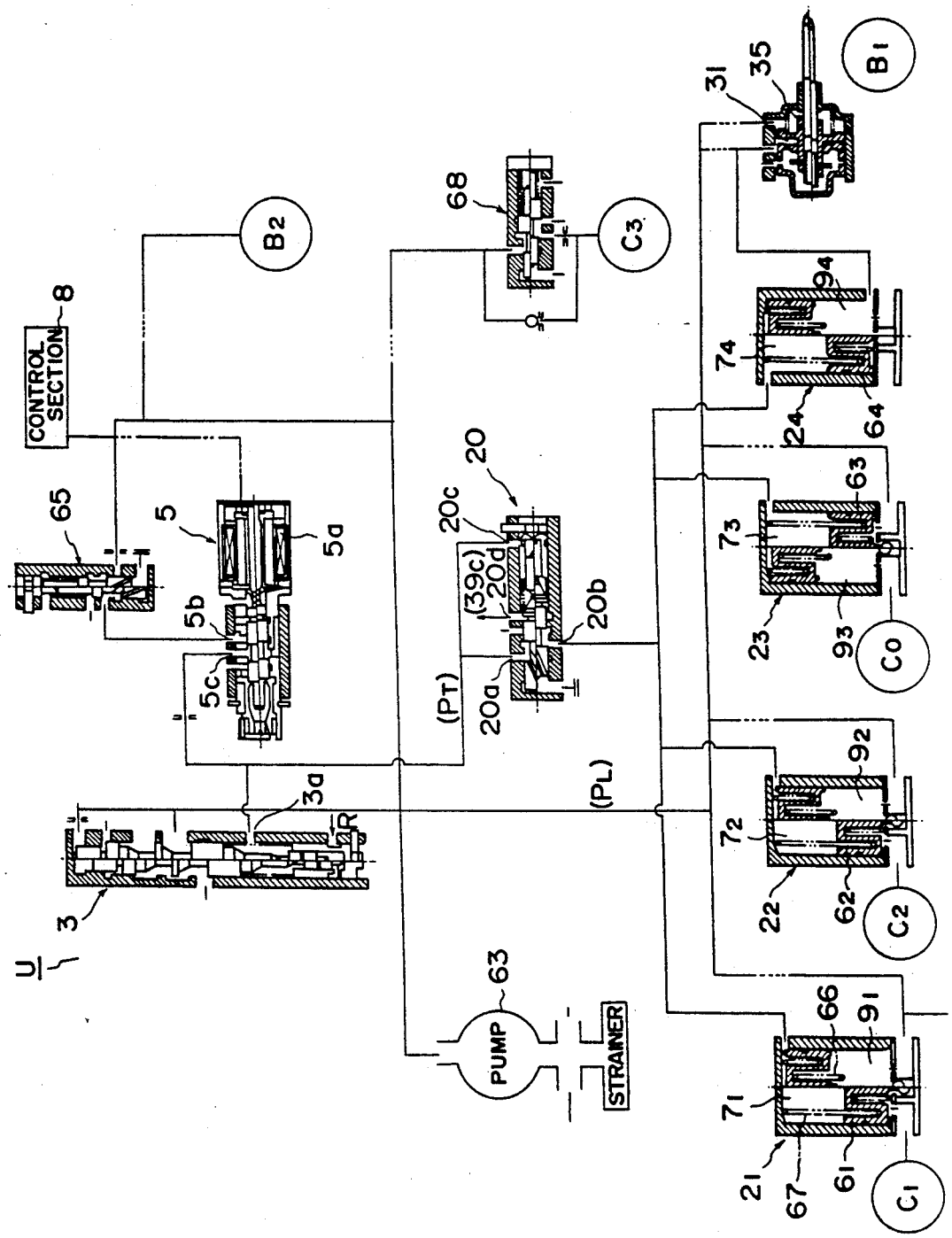
FIG. 6 is a circuit diagram of a part of the hydraulic controller in accordance with the present invention.

As shown in FIG. 6 in detail, the throttle pressure control valve 5 has a solenoid 5a operated by an electrical signal supplied from a control unit 8, an input port 5b, and an output port 5c. The throttle pressure $P_T$ is supplied from the output port 5c to a throttle pressure port 3a of the primary regulator valve 3 and is also supplied to an input port 20a of an accumulator control valve 20. A solenoid modulator valve 65 serves to supply the line pressure $P_L$ to the input port 5b of the throttle pressure control valve 5 while suitably regulating the line pressure $P_L$. The accumulator control valve 20 has, in addition to the input port 20a, a pressure regulation port 20b, a feedback port 20c and a fourth speed supply port 20d. A hydraulic pressure is supplied from the pressure regulation port 20b to back pressure chambers $7_1$, $7_2$, $7_3$, and $7_4$ of the accumulators $2_1$, $2_2$, $2_3$, and $2_4$. The accumulators $2_1$, $2_2$, $2_3$, and $2_4$ have pistons $6_1$, $6_2$, $6_3$, and $6_4$. In front of the pistons $6_1$, $6_2$, $6_3$, and $6_4$, accumulator chambers $9_1$, $9_2$, $9_3$, and $9_4$ communicating with the respective hydraulic servos are formed and comparatively short springs 66 are disposed. At the back of the pistons $6_1$, $6_2$, $6_3$, and $6_4$, the back pressure chambers $7_1$, $7_2$, $7_3$, and $7_4$ having the same pressure receiving areas as the accumulator chambers $9_1$, $9_2$, $9_3$, and $9_4$ are formed and comparatively long springs 67 are disposed.

All the accumulators $2_1$, $2_2$, $2_3$, and $2_4$ are equal in shape and are constructed by using common identical parts. The third clutch hydraulic servo $C_3$ is connected through a modulator valve 68, and the line pressure $P_L$ is directly supplied to the second brake hydraulic servo $B_2$. Both the hydraulic servos $C_3$ and $B_2$ are connected without intermediation through any accumulator.

Figure 1:
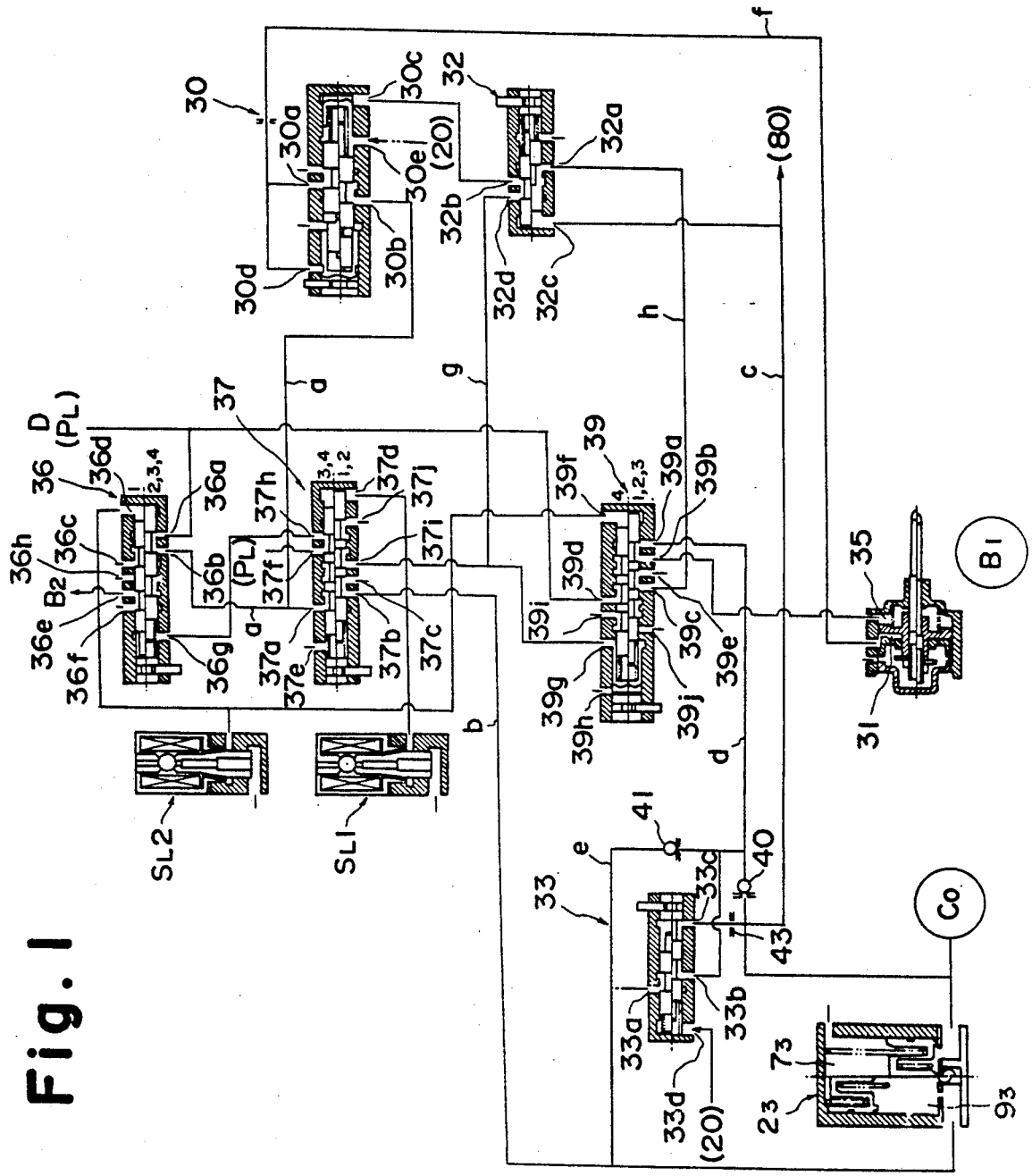
FIG. 1 is a circuit diagram of a hydraulic controller in accordance with an embodiment of the present invention, showing essential components thereof.

As shown in FIG. 1, a shift valve device is provided. The shift valve device comprises a 1-2 shift valve 36, a 2-3 shift valve 37, a 3-4 shift valve 39, a first solenoid valve $S_L1$ and a second solenoid valve $S_L2$. The 1-2 shift valve 36 and the 3-4 shift valve 39 are controlled with the second solenoid valve $S_L2$, while the 2-3 shift valve 37 is controlled with the first solenoid valve $S_L1$. More specifically, the 1-2 shift valve (third shift valve) 36 has a control oil chamber 36d to which a control hydraulic pressure is applied from the solenoid valve $S_L2$, a line pressure supply port 36a communicating with the range D port, an output port 36b, a drain port 36c, a $B_2$ port 36e, a low modulator port 36f, an R port 36h, and a restraining control oil chamber 36g. The 1-2 shift valve 36 is changed over to a lower half position when the second, third or fourth speed is selected or to an upper half position when the first speed is selected.

In the lower half position, the 1-2 shift valve 36 provides a communication between the line pressure port 36a and the output port 36b. In the upper half position, it closes the line pressure port 36a and provides a communication between the output port 36b and the drain port 36c.

The 2-3 shift valve (first shift valve) 37 has a control oil chamber 37d to which a control hydraulic pressure is applied from the solenoid valve $S_L1$, an input port 37a communicating with an oil passage a extending from the output port 36b of the 1-2 shift valve 36, an output port 37b communicating with the fourth clutch hydraulic servo $C_0$ through an oil passage b, a drain port 37c, a range 1 restraining control oil chamber 37e, a line pressure supply port 37f, a port 37h communicating with the restraining control oil chamber 36g of the 1-2 shift valve 36, a port 37i, and a drain port 37j. The 2-3 shift valve 37 is changed over to a lower half position when the first or second speed is selected or to an upper half position when the third or fourth speed is selected.

In the lower half position, the 2-3 shift valve 37 closes the input port 37a and provides a communication between the output port 37b and the drain port 37c as well as a communication between the line pressure supply port 37f and the port 37j. In the upper half position, it provides a communication between the input port 37a and the output port 37b as well as a communication between the port 37i and the drain port 37c.

The 3-4 shift valve (second shift valve) 39 has a control oil chamber 39f to which a control hydraulic pressure is applied from the solenoid valve $S_L2$, a $C_0$ port (first port) 39a, a $B_1$ release port (second port) 39b, a (third) port 39c, a drain port 39e, a restraining control oil chamber 39g communicating with the port 37i, a range 3 restraining control oil chamber 39h, a $C_3$ port 39i, a drain port 39j. The 3-4 shift valve 39 is changed over to a lower half position when the first, second or third speed is selected or to an upper half position when the fourth speed is selected.

In the lower half position, the 3-4 shift valve 39 provides a communication between the port 39a communicating with the fourth clutch hydraulic servo $C_0$ and the port 39b as well as a communication between the port 39c communicating with the second input port 32a and the drain port 39e. In the upper half position, it closes the port 39a communicating with the fourth clutch hydraulic servo $C_0$ and provides a communication between the port 39b communicating with the brake releasing oil chamber 35 and the drain port 39e as well as a communication between the line pressure supply port 39d and the port 39c.

As shown in FIG. 1, a modulator valve device is provided. The modulator valve device comprises a $B_1$ modulator valve 30 and a $B_1$ modulator control valve 32. The $B_1$ modulator valve 30 has a line pressure supply port 30b communicating with the oil passage a extending from the output port 36b of the 1-2 shift valve 36, a pressure modulation port 30a, a feedback port 30d, a restraining control oil chamber 30c, and another control oil chamber 30e communicating with the pressure regulation port 20b of the accumulator control valve 20. When set in a position such that no control pressures are applied to the control oil chambers 30c and 30e, the $B_1$ modulator valve 30 reduces the line pressure supplied through the line pressure supply port 30b at a predetermined rate and outputs the reduced pressure through the pressure modulation port 30a.

That is, the modulator valve 30 reduces the line pressure $P_L$ to produce a predetermined modulator pressure. When the pressure modulation port 30a of the modulator valve 30 communicates with a brake restraining hydraulic chamber 31 of the first brake hydraulic servo $B_1$, the modulator pressure is applied to the brake restraining hydraulic chamber 31. At this time, the first brake B1 is restrained with respect to the self-binding direction A but is not restrained with respect to the unbinding direction B. As mentioned above, the modulator valve 30 has the line pressure supply port 30b, the pressure modulation port 30a, the feedback port 30d and the restraining control oil chamber 30c, and enables an intermediate transmission speed (e.g., a third speed) to be set between the predetermined (low) transmission speed (e.g., a second speed) achieved by restraining rotation in the self-binding direction A and the other (high) transmission speed (e.g., a fourth speed) achieved by restraining rotation in the unbinding direction B. That is, the arrangement is such that the restraining hydraulic pressure is supplied to the restraining control oil chamber 30c when the predetermined transmission speed (second speed) or the other transmission speed (fourth speed) is selected, and that the supply of this restraining hydraulic pressure is stopped when the intermediate transmission speed (third speed) is selected. The modulator valve 30 makes the line pressure supply port 30b and the pressure modulation port 30a directly communicate with each other to supply the line pressure when the predetermined transmission speed or the other transmission speed is selected, or produces the modulator pressure at the pressure modulation port 30a when the intermediate transmission speed is selected.

The transmission has a frictional engagement element, e.g., the fourth clutch C0, which is retained in an engaging state when the other transmission speed (fourth speed) and the intermediate transmission speed (third speed) is selected, and the hydraulic servo $C_0$ for operating this frictional engagement element.

The modulator valve 30 also has the control oil chamber 30e to which hydraulic pressure is applied from the throttle pressure control valve 5 (refer to FIG. 5), as well as the line pressure supply port 30b, the pressure modulation port 30a, the feedback port 30d and the restraining control oil chamber 30c.

Further, the $B_1$ modulator control valve 32 has a first input port 32d communicating with an oil passage g extending from the port 37i of the 2-3 shift valve 37, a second input port 32a communicating with an oil passage h extending from the port 39c of the 3-4 shift valve 39, an output port 32b communicating with the restraining control oil chamber 30c of the $B_1$ modulator valve 30, and a control oil chamber 32c communicating with the hydraulic servo $C_0$ through an oil passage c. When no hydraulic pressure is supplied to the control oil chamber 32c, the $B_1$ modulator control valve 32 provides a communication between the first input port 32d and the output port 32b and a communication between the control oil chamber 32c and the fourth clutch hydraulic servo $C_0$. When hydraulic pressure is supplied to the control oil chamber 32c, the modulator control valve 32 is held in a position such as to provide a communication between the second input port 32a and the output port 32b and, hence, to enable a hydraulic pressure communication with the restraining control oil chamber 30c of the modulator valve 30.

A 2-3 timing valve 33 is inserted in a passage branching off from the oil passage b for communication between the output port 37b of the 2-3 shift valve 37 and the fourth clutch hydraulic servo $C_0$. The 2-3 timing valve 33 has an input port 33a communicating with the output port 37b of the 2-3 shift valve 37, an output port 33b communicating with the port 39a of the 3-4- shift valve 39, a first control oil chamber 33c communicating with the hydraulic servo $C_0$ through an orifice 43, and a second control oil chamber 33d to which a hydraulic pressure is applied from the throttle pressure control valve 5. When the hydraulic pressure of the hydraulic servo $C_0$ is increased to a predetermined level, the input port 33a and the output port 33b communicate with each other. A check ball 40 which allows a flow from the hydraulic servo $C_0$ to the port 39b of the 3-4 shift valve 39 is inserted in an oil passage d for communication between the hydraulic servo $C_0$ and the port 39b of the 3-4 shift valve 39. Another check ball 41 which allows oil discharge from the port 39a to the port 37b is inserted in an oil passage e for communication between the oil passage d and the oil passage b.

As shown in FIG. 2, the first brake hydraulic servo $B_1$ has a piston 69 fitted in a cylinder case 72 in an oil tight manner. A brake releasing hydraulic chamber 35 is formed between one side of the piston 69 and the case 72, and a return spring 70 is set therein in a compressed state.

An end plate 71 is fitted between a piston boss portion and the case in an oil tight manner while being inhibited from moving in the axial direction. A brake engaging hydraulic chamber 31 is defined between the end plate 71 and the other side of the piston 69. The cylinder case 72 is closed at its one end by a cover 73. The rod 69a fixed to the piston 69 projects outward at the other end of the case 72 and abuts against the end 62b of the band 62 of the first brake B1. The brake releasing hydraulic chamber 35 communicates with the port 39b of the 3-4 shift valve 39, and the brake engaging hydraulic chamber 31 communicates with the pressure modulation port 30a of the $B_1$ modulator valve 30 through an oil passage f.

Referring back to FIG. 5, the hydraulic controller U also has a lock-up clutch control valve 75, a lock-up clutch modulator valve 76, and a lock-up clutch control solenoid valve $S_L3$ which are controlled as desired for transmission speeds designated by double circles in FIG. 4, and a secondary regulator valve 77, a low modulator valve 79, and a C3 timing valve 80.

In the above-described arrangement, the line pressure $P_L$ is supplied to the line pressure $P_L$ supply port 30b of the $B_1$ modulator valve 30, the $B_1$ modulator valve 30 reduces the line pressure $P_L$ at the predetermined rate and outputs the modulator pressure through the pressure modulation port 30a to supply this pressure to the brake engaging hydraulic chamber 31 of the first brake hydraulic servo $B_1$. In this state, the first brake B1 operates at a comparatively small capacity based on the modulator pressure applied to the brake engaging hydraulic chamber 31, but it can stop the rotation of the sun gear S even through its capacity is small, when a predetermined transmission speed (e.g., second speed) at which the rotation of the sun gear S in the self-binding direction A is to be stopped is selected, because it has a self-boosting effect.

Even if, when the transmission is up-shifted (to, for example, the third speed) (or down-shifted to a predetermined transmission speed) by releasing the first brake B1 while engaging (or releasing) another frictional engagement element (e.g., the fourth clutch C0), the release of the first brake B1 is delayed relative to the engagement of the frictional engagement element by a timing failure so that a certain condition appears which allows the transmission speed to be temporarily shifted to an undesignated speed (e.g., fourth speed), there is no risk of the transmission being actually set to this undesignated speed. This is because the first brake B1 has no self-boosting effect with respect to rotation in the unbinding direction B although it must stop the rotation in the unbinding direction B in order to set the transmission to this speed, and because the first brake B1 therefore slips owing to stopping force failure when the braking capacity is small based on the modulator pressure. It is thus possible to prevent the transmission speed being shifted via any undesignated transmission speed. Consequently, the transmission can be shifted smoothly.

To put it concretely, when the second speed is selected, the 1-2 shift valve 36 is in the lower half position, the line pressure port 36a and the output port 36b communicate with each other, and the line pressure $P_L$ is supplied to the line pressure supply port 30b of the modulator valve 30. On the other hand, the 2-3 shift valve 37 is in the lower half position, and the line pressure from the line pressure supply port 37f is supplied to the first input port 32d of the $B_1$ modulator control valve 32 through the port 37i. The $B_1$ modulator control valve 32 is in the upper half position since no hydraulic pressure is introduced into the control oil chamber 32c, and the line pressure at the first input port 32d is supplied to the restraining control oil chamber 30c of the $B_1$ modulator valve 30 through the output port 32b. Consequently, the $B_1$ modulator valve 30 is held in the lower half position to be maintained in a line pressure supply state such that the line pressure at the line pressure supply port 30b is directly supplied to the brake engaging oil chamber 31 of the first brake hydraulic servo $B_1$ through the pressure modulation port 30a. In this state, the first brake B1 stops the rotation of the drum 63 in the self-binding direction A by the self-boosting effect; it operates positively at a large capacity determined by the pressing force of the hydraulic servo $B_1$ based on the line pressure $P_L$.

When the transmission maintained in this state is up-shifted from the second speed to the third speed, the 2-3 shift valve 37 is changed over to the upper half position to supply the line pressure $P_L$ from the input port 37a to the fourth clutch hydraulic servo $C_0$ and the accumulator $2_3$ of this servo through the output port 37b and to provide a communication between the port 37i and the drain port 37c. The hydraulic pressure in the control oil chamber 30c of the $B_1$ modulator valve 30 is thereby drained through the drain port 37c via the ports 32b, 32d and 37i. Consequently, the modulator valve 30 is set in the upper half position, and the line pressure $P_L$ from the line pressure port 30b is Output through the pressure modulation port 30a while being reduced by the effect of a feedback pressure applied to the feedback port 30d to produce the modulator pressure which is applied to the brake engaging hydraulic chamber 31 of the brake hydraulic servo $B_1$.

Further, the pressure supplied to the fourth clutch hydraulic servo $C_0$ is simultaneously supplied to the brake releasing hydraulic chamber 35 via the check ball 40 and the ports 39a and 39b of the 3-4 shift valve 39. At this time, a control pressure determined by the throttle pressure control valve 5 comprising a linear solenoid valve is applied to the control oil chamber 30e of the $B_1$ modulator valve 30 to suitably regulate the modulator pressure supplied to the brake engaging hydraulic chamber 31, thereby effecting 2-3 shift timing control and enabling the transmission to be smoothly shifted.

When the hydraulic pressure of the fourth clutch hydraulic servo $C_0$ is increased to the predetermined level and is applied to the control oil chamber 33c of the 2-3 timing valve 33, the 2-3 timing valve 33 is changed over to provide a communication between the input port 33a and the output port 33b and to thereby rapidly supply the line pressure $P_L$ to the brake releasing hydraulic chamber 35 through these ports. At this time, a control pressure determined by the throttle pressure control valve 5 is applied to the second control oil chamber 33d of the 2-3 timing valve 30 to suitably control the timing of changing over the 2-3 timing valve 33.

It is thereby possible to correctly set the timing between the engagement of the fourth clutch C0 and the release of the first brake B1. Specifically, if the first brake B1 is released before the engagement of the fourth clutch C0, a first speed condition occurs which allows both the fourth clutch C0 and the first brake B1 to be released. However, the establishment of this condition is avoided and a 2nd→1st→3rd speed shift is thereby prevented.

Furthermore, even if the timing of hydraulic pressure supply to the brake releasing hydraulic chamber 35 is delayed at the time of up-shifting from the second speed to the third speed so that a fourth speed condition appears which allows both the fourth clutch C0 and the first brake B1 to be engaged, the capacity of the band brake B1 is small enough to prevent stoppage of the sun gear S, since the direction of rotation of the sun gear S in the fourth speed state corresponds to the unbinding direction B, and since the modulator pressure is supplied to the brake engaging hydraulic chamber 31 as mentioned above. Consequently, the sun gear S is not stopped from rotating and the transmission is not shifted to the fourth speed. That is, a 2nd→4th→3rd speed shift is prevented.

At the time of up-shifting from the third speed to the fourth speed, the 3-4 shift valve 39 is changed over to the upper half position, and the hydraulic pressure in the brake releasing hydraulic chamber 35 is reduced by oil discharge from the port 39b to the drain port 39e.

When, in the third speed state, the line pressure $P_L$ for the fourth clutch hydraulic servo $C_0$ is supplied, this hydraulic pressure is supplied to the control oil chamber 32c of the modulator control valve 32, thereby maintaining the valve 32 in the lower half position.

When, in this state, the 3-4 shift valve 39 is changed over, the line pressure supply port 39d and the port 39c communicate with each other, and the line pressure $P_L$ is supplied to the second input port 32a of the $B_1$ modulator control valve 32 through these ports, and is further supplied to the restraining control oil chamber 30c of the $B_1$ modulator valve 30 through the output port 32b. The modulator valve 30 is thereby held in the lower half position and the line pressure $P_L$ at the line supply port 30b is directly supplied to the brake engaging hydraulic chamber 31 through the output port 30a without being modulated.

Consequently, in this fourth speed state, the first brake B1 stops rotation in the unbinding direction B by a sufficiently large stopping force because the first brake hydraulic servo $B_1$ applies a large pressing force based on the line pressure $P_L$. As the servo pressure is increased from the modulator pressure to the line pressure $P_L$, the engaging force is smoothly increased and the transmission is smoothly up-shifted to the fourth speed with desired reliability.

At the time of down-shifting from the third speed to the second speed, the 2-3 shift valve 37 is changed over to the lower half position, the hydraulic pressure of the fourth clutch hydraulic servo $C_0$ is drained through the drain port 37c via the port 37b, and the line pressure at the line pressure supply port 37f is supplied to the first input port 32d of the $B_1$ modulator control valve 32 through the port 37i.

Also, the hydraulic pressure in the brake releasing hydraulic chamber 35 is rapidly drained through the port 37b and the drain port 37c of the 2-3 shift valve 37 via the ports 39a and 39b, the check ball 41. The brake B1 is thereby engaged before the release of the fourth clutch C0 intermediated by the accumulator $2_3$, thereby preventing a 3rd→1st→2nd speed shift. In this case, even if the time at which the hydraulic pressure from the brake engaging hydraulic chamber 35 is released is advanced, the capacity of the first brake B1 for stopping rotation in the unbinding direction B is small enough to prevent a 3rd→4th→2nd speed shift, since a comparatively small modulator pressure is applied to the brake engaging hydraulic chamber 31.

The first brake B1 may only stop the sun gear S with respect to the self-binding direction A to set the second speed, even though its capacity is small based on the modulator pressure. The first brake B1 can therefore stop the sun gear S by the self-boosting effect to establish the second speed state. When the hydraulic pressure of the fourth clutch hydraulic servo $C_0$ is released and when the hydraulic pressure in the control oil chamber 32c of the $B_1$ modulator control valve 32 is drained, the $B_1$ modulator control valve 32 is changed over to the upper half position and the line pressure introduced to the first port 32d is supplied to the restraining control oil chamber 30c through the output port 32b, thereby maintaining the $B_1$ modulator control valve 32 in the line pressure supply state.

The hydraulic pressure applied to the brake engaging hydraulic chamber 31 is thereby increased from the modulator pressure to the line pressure $P_L$, so that the first brake is firmly engaged at a large capacity.

At the time of kick-down from the fourth speed to the second speed, the 3-4 shift valve 39 and the 2-3 shift valve 37 are simultaneously changed over to the lower half positions. Then, the hydraulic pressure of the fourth clutch hydraulic servo $C_0$ is drained through the ports 37b and 37c, and the hydraulic pressure applied to the restraining control oil chamber 30c of the modulator valve 30 is drained through the ports 32b, 32a and ports 39c and 30e. At this time, the ports 39a and 39b of the 3-4 shift valve 39 communicate with each other to allow the hydraulic pressure of the fourth clutch hydraulic servo $C_0$ to be supplied to the brake releasing hydraulic oil chamber 35. However, the hydraulic pressure of the fourth clutch hydraulic servo $C_0$ is drained through the drain port 37c, and the port 39a communicates with the drain port 37c via the check ball 41, thereby inhibiting the hydraulic pressure in the brake releasing oil chamber 35 from increasing to the brake release pressure. Therefore the line pressure $P_L$ is not supplied to the brake releasing oil chamber 35, and the third-speed state is not established. The hydraulic pressure supplied to the brake engaging hydraulic chamber 31 is changed Over from the line pressure $P_L$ to the modulator pressure and then to the line pressure $P_L$, thereby achieving a down-shift from the fourth speed to the second speed by one operation.

The operation of this embodiment will be described below in more detail with respect to each transmission speed.

When the first speed is selected while the manual valve 62 is operated to set the range D, only the first solenoid valve $S_L1$ is turned on for draining while the second solenoid valve $S_L2$ is in the off state, i.e., in the supply state, as shown in FIG. 4. In this state, hydraulic pressure is supplied to the control oil chamber 36d of the 1-2 shift valve 36 to set this valve in the upper half position while the hydraulic pressure in the control oil chamber 37d of the 2-3 shift valve 37 is released to set this valve in the lower half position. Hydraulic pressure is supplied to the control oil chamber 39f of the 3-4 shift valve 39, but this valve is restrained in the lower half position because the line pressure $P_L$ from the line pressure supply port 37f of the 2-3 shift valve 37 is supplied to the restraining control oil chamber 39g.

Consequently, the line pressure from the range D port D of the manual valve 62 is supplied to the first clutch hydraulic servo $C_1$ alone, and the other hydraulic servos are supplied with no hydraulic pressure.

At this time, the throttle valve 5 is suitably operated on the basis of a signal sent from the control unit 8 to produce the predetermined throttle pressure $P_T$, as shown in FIG. 6. Further, the throttle pressure $P_T$ is supplied to the input port 20a of the accumulator control valve 20 and is reduced at the predetermined rate by the effect of the feedback pressure, and the reduced pressure is supplied to the back pressure chambers $7_1$, $7_2$, $7_3$, and $7_4$ of the accumulators $2_1$, $2_2$, $2_3$, and $2_4$ through the output port 20b. The hydraulic pressure suitably controlled by the throttle pressure control valve 5 based on the engaging characteristics of the first clutch C1 is transmitted to the back pressure chamber $7_1$ of the accumulator $2_1$ communicating with the hydraulic servo $C_1$, thereby smoothly engaging the first clutch C1.

By the control operation of the throttle pressure control valve 5, the line pressure from the primary regulator valve 3 and the pressures in the back pressure chambers $7_2$, $7_3$, and $7_4$ of the other hydraulic servos $2_2$, $2_3$, and $2_4$ are also modulated, but other clutches C2, C3, and C0 and the brakes B1 and B2 are not influenced since they are in disengaged states.

In the first speed state in which the first clutch C1 is engaged and in which the first and second one-way clutches F1 and F0 are also engaged, the torque of the input shaft 15 is transmitted to the small ring gear R1 through the first clutch C1 and the second one-way clutch F0. At this time, since the first one-way clutch F1 inhibits the large ring gear R2 from rotating, the carrier CR rotates at a greatly reduced speed while racing the sun gear S and the drum 63 integral with the sun gear S in the self-binding direction A shown in FIG. 2. The torque of this reduced-speed rotation is extracted through the output gear 13. The torque of the gear 13 is reduced in speed by the speed reduction mechanism 51 and is thereafter transmitted to the left and right axle shafts 59a and 59b by the differential unit 52.

When the second speed is selected, the second solenoid valve $S_L2$ as well as the first solenoid valve $S_L$ is turned on. Then the 2-3 shift valve 37 and the 3-4 shift valve 39 are held in the lower half positions and the 1-2 shift valve 36 is changed over to the lower half position by hydraulic pressure release from the control oil chamber 36d. In this state, the line pressure $P_L$ from the range D port is supplied to the oil passage a through the line pressure supply port 36a and the output port 36b to be supplied to the line pressure port 30b of the $B_1$ modulator valve 30. In the 2-3 shift valve 37, the line pressure supply port 37f and the port 37i communicate with each other. The line pressure $P_L$ supplied from the line pressure supply port 37f is supplied to the first input port 32d of the $B_1$ modulator control valve 32 via the port 37i and the oil passage g. In the second speed state, therefore, the $B_1$ modulator control valve 32 is in the upper half position and the hydraulic pressure at the input port 32d is supplied to the restraining control oil chamber 30c of the $B_1$ modulator valve 30 through the output port 32b. Accordingly, the $B_1$ modulator valve 30 is restrained in the lower half position and the line pressure $P_L$ at the line pressure supply port 30b is directly output through the pressure modulation port 30a to be supplied to the brake engaging hydraulic chamber 31 of the first brake hydraulic servo $B_1$ through the oil passage f. The piston 69 is thereby extended to press the band end 62, thereby fastening the band 62 of the first brake B1 by a large force based on the line pressure $P_L$. At this time, the sun gear S and the drum 63 integral with the sun gear S are rotating in the self-binding direction A, and the first brake B1 can also stop the sun gear S by the function of self-boosting based on the rotation in the self-binding direction A, even if the fastening force is comparatively small. In this case, however, the first brake B1 firmly stops the sun gear S by the large fastening force based on the line pressure $P_L$.

At the time of up-shifting from the first speed to the second speed, the throttle pressure control valve 5 is suitably operated on the basis of an electrical signal supplied from the control unit 8, and the throttle pressure $P_T$ is regulated by the accumulator control valve 20 and is supplied to the back pressure chambers $7_1, 7_2, 7_3$, and $7_4$ of the accumulators $2_1, 2_2, 2_3$, and $2_4$, as in the case of the above-described shifting to the range D. The back pressure of the accumulator $2_4$ of the first brake hydraulic servo $B_1$ is thereby controlled suitably according to the engaging characteristics of the first brake B1, thereby smoothly engaging the first brake B1.

At this time, the accumulators $2_1$, $2_2$, and $2_3$ for the clutches C1, C2, and C0 are also back-pressure controlled. However, the second clutch C2 and the fourth clutch C0 are in the released states and are not influenced. With respect to the first clutch C1, the hydraulic pressure of the hydraulic servo $C_1$ changes as the line pressure $P_L$ changes according to the change in the throttle pressure $P_T$. However, the first clutch C1 has already been engaged and maintained in a static friction state, and the engaging hydraulic pressure is at a substantially high level with respect to the torque load of the first clutch C1. There is therefore no risk of slippage of the first clutch C1.

In the second speed state in which the first brake B1 and the second one-way clutch F0 as well as the first clutch C1 are respectively engaged, the torque of the input shaft 15 is transmitted to the small ring gear R1 through the first clutch C1 and the second one-way clutch F0. At this time, since the sun gear S is stopped by the first brake B1, the torque of the small ring gear R1 is extracted as second speed torque through the carrier CR while racing the large ring gear R2. At the time of shifting from the first speed to the second speed, the first one-way clutch F1 overruns. The present invention is therefore arranged to prevent occurrence of a clutching changeover shift shock.

When the third speed is selected, the second solenoid valve $S_L2$ is maintained in the on state while the first solenoid valve $S_L1$ is changed over to the off state. In this state, the 1-2 shift valve 36 and the 3-4 shift valve 39 are held in the lower half positions, and the 2-3 shift valve 37 is changed over to the upper half position with the control oil chamber 37d supplied with hydraulic pressure. The line pressure $P_L$ in the oil passage a supplied through the ports 36a and 36b of the 1-2 shift valve 36 is thereby introduced into the oil passage b through the input port 37b to be supplied to the fourth clutch hydraulic servo $C_0$ and the accumulator chamber $9_3$ of the accumulator $2_3$. Also, the port 37i of the 2-3 shift valve 37 communicates with the drain port 37d to drain the hydraulic pressure supplied to the first input port 32d of the $B_1$ modulator control valve 32.

The hydraulic pressure supplied to the fourth clutch hydraulic servo $C_0$ is applied to a restraining control oil chamber 80a of the C3 timing valve 80 (refer to FIG. 5) through the oil passage c, so that the C3 timing valve 80 is changed over to the upper half position. Then, the line pressure $P_L$ from the line pressure port 39d of the 3-4 shift valve 39 is supplied to an input port of the C3 timing valve 80 through the port 39i and is further supplied to the third clutch hydraulic servo C3 via an output port of this valve and the modulator valve 68.

When the hydraulic pressure of the fourth clutch hydraulic servo $C_0$ and the accumulator $2_3$ reaches the predetermined level, this hydraulic pressure is applied to the first control oil chamber 33c of the 2-3 timing valve 33. The 2-3 timing valve 33 is thereby changed over to the upper half position and the hydraulic pressure from the oil passage b is rapidly supplied to the oil passage d through the line pressure supply port 33a, the output port 33b and the check valve 40 to be supplied to the brake releasing hydraulic chamber 35 of the first brake hydraulic servo $B_1$ through the ports 39a and 39b of the 3-4 shift valve 39.

In this state, the hydraulic pressure of the fourth clutch hydraulic servo $C_0$ is applied to the control oil chamber 32c of the $B_1$ modulator control valve 32 through the oil passage c to change over the $B_1$ modulator control valve 32 to the lower half position. In the 3-4 shift valve 39, the port 39c communicates with the drain port 39e. In the $B_1$ modulator control valve 32, the second input port 32a as well as the first input port 32d is in the draining state. Accordingly, the $B_1$ modulator valve 30 is in the pressure modulating state and the line pressure $P_L$ at the line pressure supply port 30b is reduced at the predetermined rate by the effect of the feedback pressure at the feedback port 30d and so on. The modulator pressure thereby produced is applied to the brake engaging hydraulic chamber 31 of the first brake hydraulic servo $B_1$ through the oil passage f. The line pressure $P_L$ applied to the brake releasing hydraulic chamber 35 of the first brake hydraulic servo $B_1$ thereby prevails over the modulator pressure applied to the brake engaging hydraulic chamber 31 to move the piston 69, thereby releasing the band brake B1.

The present invention is arranged to prevent hydraulic pressure from being abruptly supplied to the brake releasing hydraulic chamber 35 by earlier changeover of the 2-3 timing valve based on the increase in the hydraulic pressure of the hydraulic pressure servo $C_0$ communicating with the accumulator 2. There is therefore no risk of the first brake B1 being released before the engagement of the fourth clutch $C_0$ and, hence, no possibility of the transmission being returned to the first speed state even for a very short time.

When the transmission is up-shifted from the second speed to the third speed, the throttle pressure control valve 5 is suitably controlled on the basis of an electrical signal as in the above, the throttle pressure $P_T$ is regulated through the accumulator control valve 20, and the regulated hydraulic pressure is supplied to the back pressure chambers $7_1$, $7_2$, $7_3$, and $7_4$ of the accumulators $2_1, 2_2$, $2_3$, and $2_4$ and to the second control chamber $33d$ of the 2-3 timing valve 33. The same accumulator back pressure control as that described above based on the operation of the throttle pressure control valve 5 is thereby effected to regulate the hydraulic pressure of the hydraulic servo $C_0$ according to the engaging characteristics of the fourth clutch C0, thereby smoothly engaging the clutch C0. Also, the timing of change-over of the 2-3 timing valve 33 is suitably controlled to correctly effect the fourth clutch C0 engaging timing and the first brake release timing.

Simultaneously, the hydraulic pressure from the output port $20b$ of the accumulator control valve 20 is supplied to the control oil chamber $30e$ of the $B_1$ modulator valve 30 to effect pressure modulation therein so that the modulator pressure is increased. The modulated pressure is supplied to the brake releasing hydraulic chamber 31 through the oil passage f to suitably control the brake B1 release timing in association with the control of the timing valve 33.

Even if, at the time of up-shifting from the second speed to the third speed, the timing of hydraulic pressure supply to the brake releasing oil chamber 35 of the first brake hydraulic servo $B_1$ is delayed so that a certain condition appears which allows the fourth speed state in which the fourth clutch C0 and the first brake $B_1$ are temporarily engaged, the first brake B1 allows the drum 63 to slip since the sun gear S rotates in the unbinding direction B in the fourth speed state, and since the capacity of the first brake B1 based on the modulator pressure is insufficient to stop the rotation in the unbinding direction B to establish the fourth speed state. A 2nd→4th→3rd speed shift is thereby prevented during up-shifting from the second speed to the third speed.

In the third speed state in which the third and fourth clutches C3 and C0 as well as the first clutch C1 are engaged while the first brake B1 is released, the torque of the input shaft 15 is transmitted to the small ring gear R1 through the second one-way clutch F0 and the third clutch C3 and is also transmitted to the large ring gear R2 through the fourth clutch C0. Integral rotation such that the planetary gear unit 12 is integrally operated is extracted from the carrier CR through the output gear 13. At this time, clutching changeover between the fourth clutch C0 and the first brake B1 is performed but the above-described suitable timing control is effected to prevent any shift via another transmission speed and, hence, occurrence of a shift shock. Also, the third clutch C3 is simultaneously engaged but the time at which the clutch C3 is engaged may be delayed since the clutch C3 is connected parallel to the second one-way clutch F0.

When the fourth speed is selected, the second solenoid valve $S_L 2$ as well as the first solenoid valve $S_L 1$ is changed over to the off state. In this state, the 2-3 shift valve 37 is held in the upper half position, and control hydraulic pressure is supplied to the control oil chamber $39f$ of the 3-4 shift valve 39 to change over this valve to the upper half position. Also, control hydraulic pressure is supplied to the control oil chamber $36d$ of the 1-2 shift valve 36, but this valve is maintained in the lower half position because the line pressure $P_L$ at the line pressure supply port $37f$ of the 2-3 shift valve 37 is supplied to the restraining control oil chamber $36g$ through the port $37h$.

The Bhd 1 release port $39b$ of the 3-4 shift valve 39 thereby communicates with the drain port $39e$, thereby draining the brake releasing hydraulic chamber 31 of the first brake hydraulic servo $B_1$.

At the third speed, hydraulic pressure is supplied to the $B_1$ control oil chamber $32c$ of the modulator control valve 32 through the oil passage c on the basis of the oil supply to the fourth clutch hydraulic servo $C_0$, so that the $B_1$ modulator control valve 32 is changed over to the lower half position to provide communication between the second input port $32a$ and the output port $32b$. If in this state the fourth seed is selected, the 3-4 shift valve 39 is changed over to provide communication between the line pressure supply port $39d$ and the port $39c$, and the line pressure $P_L$ is supplied to the restraining control oil chamber $30c$ of the $B_1$ modulator valve 30 through the ports $39d$ and $39c$ and the ports $32a$ and $32b$ of the modulator control valve 32 to set the $B_1$ modulator valve 30 in the lower half position, thereby changing over this valve to the line pressure supply state in which the line pressure port $30b$ and the pressure modulation port $30a$ communicate with each other. The line pressure $P_L$ from the oil passage a is therefore introduced into the oil passage f via the ports $30b$ and $30a$, and the hydraulic pressure in the brake engaging hydraulic chamber 31 of the first brake hydraulic servo $B_1$ is changed over from the modulator pressure to the line pressure.

At this time, the same electrical control of the throttle pressure control valve 5 as that described above may be effected to control the hydraulic pressure supplied to the back pressure chamber $7_4$ of the accumulator $2_4$ to enable the transmission to be shifted smoothly. In this case, however, the hydraulic pressure of the drain from the brake releasing hydraulic chamber 35 is regulated by means of orifices $83a$, $83b$, and $83c$ and so on to control the engagement of the first brake B1, as shown in FIG. 5. Since in this state the sun gear S and the drum 63 integral with the sun gear S rotate in the unbinding direction B (refer to FIG. 2), the self-boosting effect of the brake B1 cannot be maintained when the brake B1 is engaged. However, the line pressure $P_L$ is applied to the brake engaging hydraulic chamber 31 of the hydrauliC servo $B_1$, and the capacity of the band brake B1 is large enough to firmly stop the rotation in the unbinding direction B.

In the 3-4 shift valve 39, the C3 timing port $39i$ communicates with the drain port $39j$. The hydraulic pressure of the third clutch hydraulic servo $C_3$ is thereby drained through the ports $39i$ and $39j$ of the 3-4 shift valve 39 via the check ball 85 (refer to FIG. 5) and the C3 timing valve 80. In the fourth speed state, the hydraulic pressure at the port $39c$ is supplied to the port $20d$ of the accumulator control valve 20 (refer to FIG. 6) to set a substantially high accumulator back pressure.

In the fourth speed state in which the first clutch C1 and the fourth clutch C0 are in the engaged states and in which the first brake B1 is changed over to the engaged state while the third clutch C3 is changed over to the released state, the torque of the input shaft 15 is transmitted to the large ring gear R2 through the fourth clutch C0. Since the sun gear S is stopped by the first brake B1, the large ring gear R2 rotates the carrier CR at a high speed while racing the small ring gear R1. The torque of the carrier CR is transmitted to the output gear 13.

During this operation, the first brake B1 is engaged while the third clutch C3 is released. Even if the third clutch C3 is released by advanced timing, the third speed state can be maintained by the second one-way clutch F0. Consequently, the engagement of the first brake B1 is controlled by means of the orifices 83a, 83b, and 83c and so on so as to slightly delay the engaging timing, thereby preventing occurrence of a shift shock owing to clutching changeover.

When the transmission is down-shifted from the fourth speed to the third speed, the 3-4 shift valve 39 is changed over to the lower half position, as mentioned above. The hydraulic pressure in the oil passage b is thereby supplied to the brake releasing hydraulic pressure chamber 35 of the first brake hydraulic servo B1 through the ports 39a and 39b, and the line pressure $P_L$ at the line pressure supply port 39d is supplied to the third clutch hydrauliC servo $C_3$ via the port 39i, the C3 timing valve 80 and the C3 modulator valve 68. At this time, the release hydraulic pressure supplied to the brake releasing hydraulic chamber 35 of the hydraulic servo B1 is controlled by means of the orifices 83b and 83c and so on, and the second one-way clutch F0 is thereby changed over from the overrun state to the engaged state, thereby enabling the transmission to be shifted smoothly.

When the transmission is down-shifted from the third speed to the second speed, the 2-3 shift valve 37 is changed over to the lower half position to provide communication between the $C_0$ port 37b and the drain port 37c, as mentioned above. Then, the hydraulic pressure in the brake releasing hydraulic chamber 35 of the first brake hydraulic servo B1 is first drained through the drain port 37c via the ports 39a and 39b, the oil passage d, the check ball 41, the oil passage e and the port 37c, and the hydraulic pressure of the third clutch hydraulic servo $C_0$ is drained through the oil passage b and the drain port 37c along with the hydraulic pressure in the accumulator chamber $9_3$ of the accumulator $2_3$.

The release of the fourth clutch C0 is thereby delayed relative to the engagement of the first brake B1, thereby preventing a shift via the first speed state in which both the fourth clutch C0 and the first brake are released, i.e., a 3rd→1st→2nd speed shift.

Further, there is a possibility of the timing of draining the brake releasing hydraulic chamber 35 of the first brake servo B1 being excessively advanced so that a certain condition appears which allows the fourth speed state in which both the fourth clutch C0 and the first brake B1 are engaged. In such an event, however, since the hydraulic pressure supplied to the restraining control oil chamber 30c of the B1 modulator valve 30 has already been released in the third speed state to output the modulator pressure through the pressure modulation port 30a, and since this modulator pressure has been applied to the brake engaging hydraulic chamber 31 to operate the first brake B1, the capacity of the brake B1 is insufficient for the rotation of the sun gear S in the unbinding direction B in the fourth speed state, thereby preventing establishment of the fourth speed state. The brake B1 firmly stops the rotation of the sun gear S in self-binding direction A at the second speed by the self-boosting effect, thereby establishing the second speed state.

Thus, a 3rd→4th→2nd speed shift as well as the above-described 3rd→1st→2nd speed shift is prevented, and the transmission can be down-sifted smoothly.

At the time of down-shifting from the third speed to the second speed, the C3 timing valve 80 is changed over to the lower half position as the hydraulic pressure based on the hydraulic servo $C_0$ is released from the restraining control oil chamber 80a (refer to FIG. 5). The hydraulic pressure of the hydraulic servo $C_3$ is thereby drained through the drain port of the C3 timing valve 80 via the check ball 85.

When the transmission is down-shifted from the second speed to the first speed, the 1-2 shift valve 36 is changed over to the upper half position to provide communication between the output port 36b and the drain port 36c. Accordingly, the hydraulic pressure in the brake engaging hydraulic chamber 31 of the first brake hydraulic servo B1 is drained through the drain port 36c via the oil passage f, the ports 30a and 30b of the modulator valve 30, the oil passage a and the port 36b.

At the time of kick-down from the fourth speed to the second speed, the 3-4 shift valve 39 and the 2-3 shift valve 37 are changed over to the lower half positions. The hydraulic pressure of the fourth clutch hydraulic servo $C_0$ is thereby drained through the drain port 37c via the oil passage b and the port 37b, and the hydraulic pressure in the brake releasing hydraulic oil chamber 35 of the first brake hydraulic servo B1 is drained through the drain port 37c via the ports 39b and 39a, the oil passage d, the check ball 41, the oil passages e and b and the port 37b. At this time, the hydraulic pressure supplied to the control oil chamber 32c of the B1 modulator control valve 32 from the hydraulic servo $C_0$ is released to change over the B1 modulator control valve 32 to the upper half position, and the first input port 32a is drained to temporarily release the restraining pressure in the restraining control oil chamber 30c of the B1 modulator valve 30 so that the B1 modulator valve 30 produces the modulator pressure. However, the line pressure $P_L$ is immediately supplied to the port 32d of the control valve 32 through the port 37i of the 2-3 shift valve 37, and is further supplied to the restraining control oil chamber 30c through the port 32b, thereby restraining the B1 modulator valve 30 in the line pressure supply state. The first brake B1 is therefore maintained in the engaged state without being temporarily released, and the transmission is down-shifted quickly and smoothly by one operation.

In the case where the manual valve 62 is operated to select the range R, the line pressure $P_L$ from the range R port is supplied to the second clutch hydraulic servo $C_2$ and the accumulator $2_2$ of this servo. At this time, the throttle pressure control valve 5 is suitably controlled on the basis of an electrical signal from the control unit 8, and the hydraulic pressure reduced by the accumulator control valve 20 is supplied to the back pressure chambers $7_1$, $7_2$, $7_3$, and $7_4$ of the accumulators $2_1$, $2_2$, $2_3$, and $2_4$, as in the above. Consequently, the back pressure control of the accumulator $2_2$ is effected to control the hydraulic pressure of the hydraulic servo $C_2$ according to the engaging characteristics of the second clutch C2, thereby enabling the transmission to be smoothly shifted for N→R or D→R changeover.

If, in this reverse range, the vehicle travels at a predetermined speed, e.g., 7 km/h or lower, that is, it is in a substantially stopped state, the 1-2 shift valve 36 is in the lower half position and the line pressure $P_L$ from the range R port is supplied to the second brake hydraulic servo B2 through the ports 36h and 36e.

In the reverse state in which the second clutch C2 and the second brake B2 are respectively engaged, the torque of the input shaft 15 is transmitted to the sun gear S through the second clutch C2, and the torque of the sun gear S is transmitted as a reverse torque to the carrier CR while racing the small ring gear R1 is the reverse direction, since the large gear R2 is stopped by the second brake B2. The reverse torque is extracted through the output gear 13.

If, in the reverse range, the vehicle travels by inertia at a speed higher than the predetermined speed, the first solenoid valve $S_L1$ is turned to change over the 1-2 shift valve 36 to the upper half position. In this state, no hydraulic pressure is supplied to the second brake hydraulic servo $B_2$, and the reverse state is not established.

In the case where the manual valve 62 is operated to select the range 3, the line pressure $P_L$ from the range 3 port is supplied to the restraining control oil chamber 39h of the 3-4 shift valve 39 to restrain the 3-4 shift valve 39 in the lower half position to inhibit this valve from being set in the upper half position, i.e., the fourth speed position.

In the case where the manual valve 62 is operated to the range 2, the line pressure from the range 2 port is supplied to the restraining control oil chamber 80b of the C3 timing valve 80 (refer to FIG. 5) to restrain the C3 timing valve 80 in the upper half position, so that the third clutch hydraulic servo $C_3$ is constantly supplied with hydraulic pressure. The input shaft 15 and the small ring gear R1 are thereby connected through the third clutch C3 to effect engine braking by inhibiting inertial running based on overrunning of the second one-way clutch F0 at the time of coasting.

In the case where the manual valve 62 is operated to select the range 1, the line pressure $P_L$ from the range 1 port is supplied to the restraining control oil chamber 37e of the 2-3 shift valve 37 to restrain the 2-3 shift valve 37 in the lower half position to inhibit this valve from being set in the upper half position, i.e., the second/-third speed position. The line pressure $P_L$ from the range 1 port is reduced by the low modulator valve 79, and the reduced pressure is supplied to the port 36f of the 1-2 shift valve 36. The 1-2 shift valve 36 is thereby restrained in the first/second speed state. At the first speed, the modulator pressure is supplied to the second brake hydraulic servo $B_2$.

Figure 7:
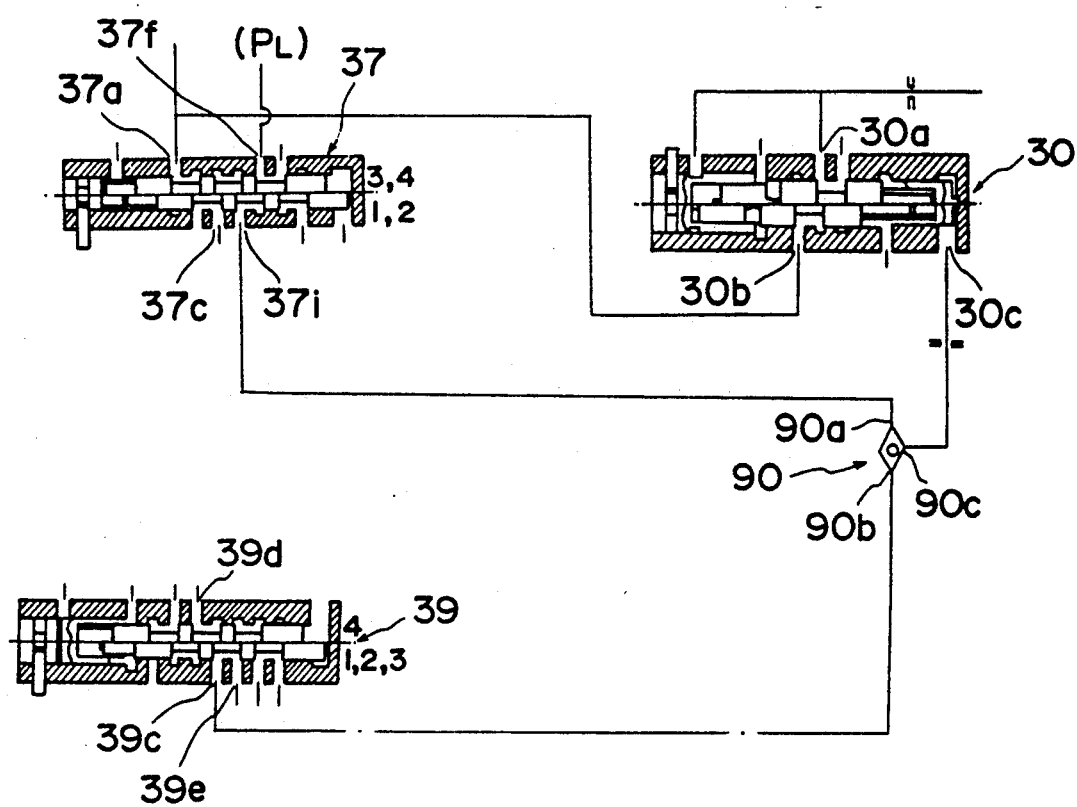
FIG. 7 is a circuit diagram of another embodiment of the present invention based on a partial modification of the first embodiment.

In the above-described embodiment, the $B_1$ modulator control valve 32 is used but this valve is not always necessary. For example, an arrangement such as that shown in FIG. 7 may alternatively be adopted.

That is, the port 37i of the 2-3 shift valve 39 communicates with an input port 90a of a two-way check valve 90, while the port 39c of the 3-4 shift valve 39 communicates with another input port 90b of the two-way check valve 90. An output port 90c of the two-way check valve 90 communicates with the restraining control oil chamber 30c of the $B_1$ modulator valve 30.

When the second speed is selected, the line pressure $P_L$ from the line pressure supply port 37f of the 2-3 shift valve 37 is supplied to the restraining control oil chamber 30c of the $B_1$ modulator valve 30 through the port 37i and the input and output ports 90a and 90c of the two-way check valve 90, thereby maintaining the $B_1$ modulator valve 30 in the line pressure supply state.

When the fourth speed is selected, the line pressure from the line pressure supply port 39d of the 3-4 shift valve 39 is supplied to the restraining control oil chamber 30c through the port 39e and input and output ports 90b and 90c of the two-way check valve 90, thereby maintaining the $B_1$ modulator valve 30 in the line pressure supply state.

When the third speed is selected, the port 37i of the 2-3 shift valve 37 communicates with the drain port 37c, and the port 39c of the 3-4 shift valve 39 also communicates with the drain port 39e to set the restraining control oil chamber 30c in the released state, so that the $B_1$ modulator valve 30 suitably modulates the line pressure input through the line pressure supply port 30b and outputs the modulated pressure through the pressure modulation port 30a.

In accordance with the present invention, as described above in detail, when the modulator pressure is supplied from the $B_1$ modulator valve 30 to the brake engaging hydraulic chamber 31 of the first brake hydraulic servo $B_1$, the first brake B1 is engaged with respect to its self-binding direction A but is not engaged with respect to the unbinding direction B. At the time of up-shifting from a predetermined (low) transmission speed (e.g., second speed) or down-shifting to the predetermined transmission speed, the transmission can be thereby prevented from being temporarily shifted to another (high) transmission speed (e.g., fourth speed) related to the operation of the first brake B1. Thus, the present invention provides a simple and low-cost transmission which can be smoothly operated for a predetermined shift (e.g., 2nd→3rd up-shift or 3rd→2nd down-shift) with respect to the whole ranges of throttle pressure and vehicle speeds without any substantial shift shock, although it is designed to improve the performance in terms of mounting on a vehicle by removing one-way clutches for a reduction in the transmission size.

An intermediate transmission speed (third speed) may be set between the above predetermined transmission speed (e.g., second speed) and the other speed (e.g., fourth speed). The modulator pressure is supplied to the restraining control oil chamber 30c of the $B_1$ modulator valve 30 when the predetermined speed or the other speed is selected, but the modulator pressure is not supplied when the intermediate speed is selected. According to this arrangement, the transmission can be smoothly shifted from the predetermined speed to the intermediate speed or from the intermediate speed to the predetermined speed without being shifted by way of the other speed. For the predetermined speed and the other speed, the line pressure $P_L$ is supplied to the brake engaging hydraulic chamber 31 to make the first brake B1 to be engaged firmly at a sufficiently large braking capacity.

The control pressure may be supplied from the throttle pressure control valve 5 to the control oil chamber 30e of the $B_1$ modulator valve 30 to suitably control the hydraulic pressure supplied to the brake engaging hydraulic chamber 31 at the time of shifting from the predetermined speed to the intermediate speed or from the intermediate speed to the predetermined speed, thereby effecting the desired changeover timing and, hence, smooth shifting.

The $B_1$ modulator control valve 32 may be provided which provides communication between the first input port 32d and the output port 32b when the control oil chamber 32c is not supplied with hydraulic pressure, and which provides communication between the second input port 32a and the output port 32b when hydraulic pressure is supplied to a hydraulic servo for a frictional engagement element servo (e.g., the fourth clutch hydraulic pressure servo $C_0$) and the control oil chamber 32c is supplied with hydraulic pressure. It is thereby possible to positively and rapidly supply the line pressure $P_L$ to the brake engaging hydraulic chamber 31 when the predetermined speed (e.g. second speed) or the other speed (e.g., fourth speed) is selected. The transmission can therefore be operated rapidly and smoothly for up-shift from the predetermined speed to the other speed (e.g., 1st→2nd speed up-shift or 3rd→4th speed up-shift) or down-shift from the other speed to the predetermined speed.

Further, the 2-3 timing valve 33 controlled by the pressure supplied to the frictional engagement element hydraulic servo (e.g., the fourth clutch hydraulic servo $C_0$) may be provided to enable the brake engaging hydraulic chamber 35 to be rapidly supplied with hydraulic pressure to set a suitable timing between the engagement of the frictional engagement element and the release of the first brake B1, when the hydraulic pressure of the frictional engagement element hydraulic servo reaches a predetermined level, thereby preventing a shift via an undesignated speed (e.g., 2nd→1st→3rd shift) caused by earlier release of he first brake B1. In cooperation with the supply of the modulator pressure to the brake engaging hydraulic chamber 31, this timing control of the first brake B1 enables the transmission to be smoothly shifted without failure (for, e.g., 2nd→3rd speed or 3rd→2nd speed shift).

Specifically, if the second control oil chamber 33d to which hydraulic pressure is supplied from the throttle pressure control valve 5 is provided in the 2-3 timing valve 33, the changeover of the 2-3 timing valve 33 can be controlled so as to set a suitable timing of clutching changeover between the frictional engagement element (e.g., the fourth clutch C0) and the first brake B1.

If the 3-4. shift valve 39 is provided with the port 39a communicating with the frictional engagement element hydraulic servo (e.g., the fourth clutch hydraulic servo $C_0$), the port 39b communicating with the brake releasing hydraulic chamber 35, the port 39c communicating with the second input port 32a of the $B_1$ modulator control valve 32, the line pressure port 39d, and the drain port 30e, the $B_1$ modulator valve 30 can be restrained in the line pressure supply state when the other transmission speed is selected (e.g., the fourth speed), thereby positively maintaining this speed. It is also possible to prevent occurrence of any shift via the other speed. At the time of skip-down-shifting from the other speed to the predetermined speed (e.g., from the fourth speed to the second speed), the transmission can be shifted by one operation while the first brake B1 is maintained in the engaged state without being released, thereby kick-down rapidly and smoothly.

The present invention is not limited to the above-described embodiments; it is intended to cover all changes and modifications which do not constitute departures from the spirit and scope of the invention.

What we claim is:

1. A hydraulic controller for an automatic transmission for establishing a low transmission speed, and an intermediate transmission speed, and a high transmission speed having
    a planetary gear unit, and
    a plurality of frictional engagement elements for establishing a transmission speed by engaging or disengaging an element of a planetary gear unit, having a band brake with a brake engaging hydraulic chamber and a brake releasing hydraulic chamber for establishing the low transmission speed by engaging the element of the planetary gear unit and establishing the intermediate transmission speed by disengaging the element of the planetary gear unit, said element of the planetary gear unit being stopped from rotating in th self-binding direction at the low transmission speed and rotating against the self-binding direction at the intermediate speed by engaging another frictional engagement element of the plurality of frictional engagement elements;
hydraulic controller comprising:
    an oil pressure source,
    a primary regulator valve connected to the oil pressure source for regulating a line pressure,
    a shift valve device provided between the primary regulator valve and the brake releasing hydraulic chamber connecting the brake releasing hydraulic chamber to the primary regulator valve at the intermediate transmission speed and disconnecting the brake releasing hydraulic chamber from the primary regulator valve, and
    a modulator valve device provided between the primary regulator valve and the brake engaging hydraulic chamber for supplying a modulated pressure from the line pressure therethrough to the brake engaging hydraulic chamber at the low and intermediate transmission speeds,
whereby the element of the planetary unit is not engaged with the band brake by the modulated pressure supplied to the brake engaging hydraulic chamber but rotating against the self-binding direction when the modulated pressure is supplied to the brake engaging hydraulic chamber.

2. A hydraulic controller for an automatic transmission for establishing a low transmission speed, an intermediate transmission speed, and a high transmission speed having
    a planetary gear unit, and
    a plurality of frictional engagement elements for establishing a transmission speed by engaging or disengaging an element of a planetary gear unit, having a band brake with a brake engaging hydraulic chamber and a brake releasing hydraulic chamber for establishing the low and high transmission speeds by engaging the element of the planetary gear unit and establishing the intermediate transmission speed by disengaging the element of the planetary gear unit, said element of the planetary gear unit being stopped from rotating in the self-binding direction at the low transmission speed and rotating against the self-binding direction at the intermediate and high transmission speeds by engaging another frictional engagement element of the plurality of frictional engagement elements;
said hydraulic controller comprising:
    an oil pressure source,
    a primary regulator valve connected to the oil pressure source for regulating a line pressure,
    a shift valve device provided between the primary regulator valve and the brake releasing hydraulic chamber for connecting the brake releasing hydraulic chamber to the primary regulator valve at the intermediate transmission speed and disconnecting the brake releasing hydraulic chamber from the primary regulator valve, and
    a modulator valve device provided between the primary regulator valve and the brake engaging hydraulic chamber for supplying a line pressure to the brake engaging hydraulic chamber at a transmission speed other than the low and intermediate transmission speeds and supplying a modulated pressure from the line pressure therethrough to the brake engaging hydraulic chamber at the low and intermediate transmission speeds, whereby the element of the planetary unit is not engaged with the band brake by the modulated pressure supplied to the brake engaging hydraulic chamber but rotating against the self-binding direction when the modulated pressure is supplied to the brake engaging hydraulic chamber and the brake releasing hydraulic chamber is disconnected from the primary regulator valve by the shift valve device.

3. A hydraulic controller for an automatic transmission according to claim 2, said shift valve device having
- a first shift valve provided between the primary regulator valve and the hydraulic servo of the another element for engaging or disengaging the another frictional engagement element, and
- a second shift valve provided between the primary regulator valve and the brake releasing hydraulic chamber for connecting or disconnecting the brake releasing hydraulic chamber to or from the primary regulator valve.

4. A hydraulic controller for an automatic transmission according to claim 3, furthermore comprising:
- a timing valve provided between the primary regulator valve and the second shift valve for connecting the brake releasing hydraulic chamber to the primary regulator valve through the second shift valve in response to the line pressure applied to the hydraulic servo of the another element at the intermediate transmission speed.

5. A hydraulic controller for an automatic transmission according to claim 4, said timing valve having
- a line pressure supply port,
- a port communicated with the brake releasing hydraulic chamber, and
- a control oil chamber communicated with the hydraulic servo for the frictional engagement element, said line pressure supply port of the timing valve communicated with the port communicated with the brake releasing hydraulic chamber when the hydraulic servo of the frictional engagement is supplied with hydraulic pressure and the hydraulic pressure reaches a predetermined level.

6. A hydraulic controller for an automatic transmission according to claim 5, said timing valve having a second control oil chamber for receiving hydraulic pressure for its operation from a throttle pressure control valve.

7. A hydraulic controller for an automatic transmission according to claim 3, said second shift valve having
- a first port communicated with the hydraulic servo of the frictional engagement element,
- a second port communicated with the brake releasing hydraulic chamber,
- a third port communicated with the modulator control valve,
- a line pressure supply port, and
- a drain port, said second shift valve providing a communication between the first port and the second port, and a communication between the third port and the drain port when set to a predetermined changeover position, said second shift valve closing the first port and providing a communication between the second port and the drain port and a communication between the line pressure supply port and the modulator control valve when set to another changeover position.

8. A hydraulic controller for an automatic transmission according to claim 7, furthermore comprising a third shift valve, said third shift valve having
- a line pressure supply port,
- an output port communicated with the line pressure supply port of the modulator valve, and
- a drain port, said third shift valve providing a communication between the line pressure supply port and the output port when set to a predetermined changeover position, closing the line pressure supply port and providing a communication between the output port and the drain port when set to another changeover position, said first shift valve having
- an input port communicated with the output port of the third shift valve,
- an output port communicated with the hydraulic servo of the frictional engagement element,
- a drain port,
- a line pressure supply port, and
- a port communicated with the modulator control valve, said first shift valve closing the input port, providing a communication between the output port and the drain port, a communication between the line pressure supply port and the port communicated with the modulator control valve when set to a predetermined changeover position, a communication between the input port and the output port, and a communication between the port communicated with the modulator control valve and the drain port when set to another changeover position.

9. A hydraulic controller for an automatic transmission according to claim 8,
said band brake being a brake capable of being engaged when a forward second speed is selected and capable of being engaged when a forward fourth speed is selected,
said another frictional engagement element being a clutch capable of being engaged when a forward third speed is selected and capable of being engaged when a forward fourth speed is selected,
said third shift valve being a 1-2 shift valve changed over for a shift between the first and second speeds,
said first shift valve being a 2-3 shift valve changed over for a shift between the second and third speeds, and
said second shift valve being a 3-4 shift valve changed over for a shift between the third and fourth speeds.

10. A hydraulic controller for an automatic transmission according to claim 2, said modulator valve device having
- a modulator valve provided between the primary regulator valve and the brake engaging hydraulic chamber, and
- a modulator control valve provided between the primary regulator valve and the modulator valve for supplying the line pressure to the modulator valve to connect the brake engaging hydraulic chamber to the primary regulator valve therethrough so as to supply a line pressure to the brake engaging hydraulic chamber at the low and high transmission speeds.

11. A hydraulic controller for an automatic transmission according to claim 10, said modulator valve having a control oil chamber for receiving hydraulic pressure for its operation from a throttle pressure control valve, a line pressure supply port, a pressure modulation port for supplying a modulated pressure from a line pressure, a feedback port communicated with the pressure modulation port, and a restraining control oil chamber connected to the modulator control valve for supplying a line pressure thereto to supply a line pressure to the brake engaging hydraulic chamber.

12. A hydraulic controller for an automatic transmission according to claim 10, said shift valve device having a first shift valve provided between the primary regulator valve and the hydraulic servo of the another element for engaging or disengaging the another frictional engagement element, and a second shift valve provided between the primary regulator valve and the brake releasing hydraulic chamber for connecting or disconnecting the brake releasing hydraulic chamber to or from the primary regulator valve.

* * * * *

UNITED STATES PATENT AND TRADEMARK OFFICE
CERTIFICATE OF CORRECTION

PATENT NO. : 5,020,393
DATED : June 4, 1991
INVENTOR(S) : KUWAYAMA et al It is certified that error appears in the above-identified patent and that said Letters Patent is hereby corrected as shown below:

Column 24, line 3, "th" should read --the--;

line 8, before "hydraulic" insert --said--; and line 14, before "connecting" insert --for--.

Column 25, line 47, "forreceiving" should read --for receiving--.

Signed and Sealed this

Ninth Day of March, 1993

*Attest:*

STEPHEN G. KUNIN

*Attesting Officer*     *Acting Commissioner of Patents and Trademarks*